(12) United States Patent
Feng et al.

(10) Patent No.: US 12,069,342 B2
(45) Date of Patent: Aug. 20, 2024

(54) METHOD AND APPARATUS FOR PLAYING MULTIMEDIA DATA, ELECTRONIC DEVICE, AND STORAGE MEDIUM

(71) Applicant: BEIJING BYTEDANCE NETWORK TECHNOLOGY CO., LTD., Beijing (CN)

(72) Inventors: Ruixin Feng, Beijing (CN); Zhen Cao, Singapore (SG); Yixiu Huang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/440,148

(22) PCT Filed: Jun. 18, 2021

(86) PCT No.: PCT/CN2021/100913
§ 371 (c)(1),
(2) Date: Sep. 16, 2021

(87) PCT Pub. No.: WO2022/033171
PCT Pub. Date: Feb. 17, 2022

(65) Prior Publication Data
US 2022/0321966 A1 Oct. 6, 2022

(30) Foreign Application Priority Data
Aug. 14, 2020 (CN) .......................... 202010821430.5

(51) Int. Cl.
*H04N 21/472* (2011.01)
*H04N 21/437* (2011.01)

(52) U.S. Cl.
CPC ......... *H04N 21/472* (2013.01); *H04N 21/437* (2013.01)

(58) Field of Classification Search
CPC .......... H04N 21/43072; H04N 21/437; H04N 21/472; H04N 21/47217; H04N 21/6581
See application file for complete search history.

(56) References Cited

U.S. PATENT DOCUMENTS 10,135,887 B1 * 11/2018 Esser .................... H04L 65/612
2015/0051913 A1 2/2015 Choi
(Continued)

FOREIGN PATENT DOCUMENTS

| CN | 102420665 A | 4/2012 |
| CN | 105979379 A | 9/2016 |

(Continued)

OTHER PUBLICATIONS

International Patent Application No. PCT/CN2021/100913, International Search Report mailed Sep. 18, 2021, 5 pages.
(Continued)

*Primary Examiner* — Rong Le

(57) ABSTRACT

The present disclosure relates to the field of multimedia technology, and more particularly, to a method and an apparatus for playing multimedia data, an electronic device, and a storage medium. The method for playing multimedia data includes: acquiring, in response to a first trigger operation for first multimedia data currently being played as received via a first interface of a first platform, second multimedia data corresponding to the first multimedia data; and playing the second multimedia data on the first platform. With the method for playing multimedia data according to the present disclosure, it is possible to shorten the length of the path from playing the first multimedia data to playing the second multimedia data, thereby improving the efficiency in playing the second multimedia data.

16 Claims, 4 Drawing Sheets

Acquire, in response to a first trigger operation for first multimedia data currently being played as received via a first interface of a first platform, second multimedia data corresponding to the first multimedia data — S110

Play the second multimedia data on the first platform — S120

(56) References Cited

U.S. PATENT DOCUMENTS

| | | | |
|---|---|---|---|
| 2015/0381684 A1 | 12/2015 | HuangFu et al. | |
| 2016/0212501 A1 | 7/2016 | Master et al. | |
| 2017/0195753 A1* | 7/2017 | Dakss | G11B 27/031 |
| 2018/0027274 A1* | 1/2018 | Wu | H04N 21/42224 709/203 |
| 2018/0268870 A1* | 9/2018 | Chen | H04N 21/8549 |
| 2021/0243502 A1* | 8/2021 | Choi | H04N 21/4788 |
| 2022/0050559 A1 | 2/2022 | Feng et al. | |
| 2022/0078512 A1* | 3/2022 | Yuan | H04N 21/41407 |

FOREIGN PATENT DOCUMENTS

| | | | |
|---|---|---|---|
| CN | 106358082 A | 1/2017 |
| CN | 106468954 A | 3/2017 |
| CN | 107734376 A | 2/2018 |
| CN | 108184138 A | 6/2018 |
| CN | 108228547 A | 6/2018 |
| CN | 109005464 A | 12/2018 |
| CN | 109120996 A | 1/2019 |
| CN | 109286846 A | 1/2019 |
| CN | 110446114 A | 11/2019 |
| CN | 111930973 A | 11/2020 |

OTHER PUBLICATIONS

Chinese Patent Application No. 202010821430.5, Rejection Decision mailed Dec. 2, 2021, 7 pages with English Translation.
Chinese Patent Application No. 202010821430.5, First Office Action and Search mailed May 20, 2021, 18 pages with English Translation.
Chinese Patent Application No. 202010821430.5, Second Office Action mailed Aug. 25, 2021, 9 pages with English Translation.
Reexamination Decision issued Apr. 6, 2022 in Chinese Patent Application No. 202010821430.5 (1 page) with an English translation (1 page).
Notification to Grant Patent Right for Invention and Supplementary Search issued May 10, 2022 in Chinese Patent Application No. 202010821430.5 (4 pages) with an English translation (2 pages).
Yue Zou, "S3C2442 and MPEG2-TS in the Multimedia Player Application," Journal of Xinjiang University (Natural Science Edition), vol. 27, No. 3, pp. 353-356, Aug. 2010 with English abstract.
Examination Report issued May 10, 2023 in Indian Application No. 202127041893, with English translation (6 pages).
Extended European Search Report issued Sep. 29, 2023 in European Application No. 21855226.3 (7 pages).
Office Action issued Sep. 8, 2023 in Indonesian Application No. P00202107664, with English translation (4 pages).

* cited by examiner

METHOD AND APPARATUS FOR PLAYING MULTIMEDIA DATA, ELECTRONIC DEVICE, AND STORAGE MEDIUM

CROSS-REFERENCE TO RELATED APPLICATION

The present application is a U.S. 371 Application of International Patent Application No. PCT/CN2021/100913, filed on 18 Jun. 2021, which application claims priority to Chinese Patent Application No. 202010821430.5, titled "METHOD AND APPARATUS FOR PLAYING MULTIMEDIA DATA, ELECTRONIC DEVICE, AND STORAGE MEDIUM", filed with CNIPA on Aug. 14, 2020, which are incorporated herein by reference in their entireties.

TECHNICAL FIELD

The present disclosure relates to the field of multimedia technology, and more particularly, to a method and an apparatus for playing multimedia data, an electronic device, and a storage medium.

BACKGROUND

With the development of information technology, more and more users tend to display and transmit information in form of multimedia data, including video, audio, etc. Taking video as an example, a user may want to obtain background music in the video, but the existing video platform cannot support independent play of the complete background music.

In this case, in general, the user typically needs to memorize relevant information of audio data, invoke a third-party platform to search for the relevant information of the audio data, and then use a corresponding play platform based on the search result to play the corresponding audio data. However, due to the fact that there are a large number of audio contents with the same name and the same segment in the information on the Internet, this scheme sometimes cannot accurately obtain the audio data the user wants. Even if the audio data the user wants can be obtained, with this cross-platform approach, the path for obtaining the audio data is relatively long, and the path for obtaining audio data is broken, resulting in degraded user experience.

SUMMARY

In order to solve at least one of the above problems, the following solutions are provided.

In a first aspect, a method for playing multimedia data is provided. The method includes: acquiring, in response to a first trigger operation for first multimedia data currently being played as received via a first interface of a first platform, second multimedia data corresponding to the first multimedia data; and playing the second multimedia data on the first platform.

In a second aspect, an apparatus for playing multimedia data is provided. The apparatus includes: an audio data acquiring module configured to acquire, in response to a first trigger operation for first multimedia data currently being played as received via a first interface of a first platform, second multimedia data corresponding to the first multimedia data; and an audio data playing module configured to play the second multimedia data on the first platform.

In a third aspect, an electronic device is provided. The electronic device includes a memory, a processor, and a computer program stored on the memory and executable on the processor. The processor is configured to, when executing the program, implement the method for playing multimedia data according to the first aspect of the present disclosure.

In a fourth aspect, a computer-readable storage medium is provided. The computer-readable storage medium has a computer program stored thereon. The program, when executed by a processor, implements the method for playing multimedia data according to the first aspect of the present disclosure.

The solutions according to the present disclosure have the following advantageous effects. In the method for playing multimedia data according to the present disclosure, in response to a first trigger operation for first multimedia data currently being played as received via a first interface of a first platform, second multimedia data corresponding to the first multimedia data is acquired, and the second multimedia data is played directly on the first platform, without the need to jump to another platform for searching and playing. In this way, it is possible to shorten the length of the path from playing the first multimedia data to playing the second multimedia data, thereby improving the efficiency in playing the second multimedia data and improving the user experience.

Additional aspects and advantages of the present disclosure will be given at least in part in the following description, and become apparent from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which.

DESCRIPTION OF EMBODIMENTS

Figure 1:
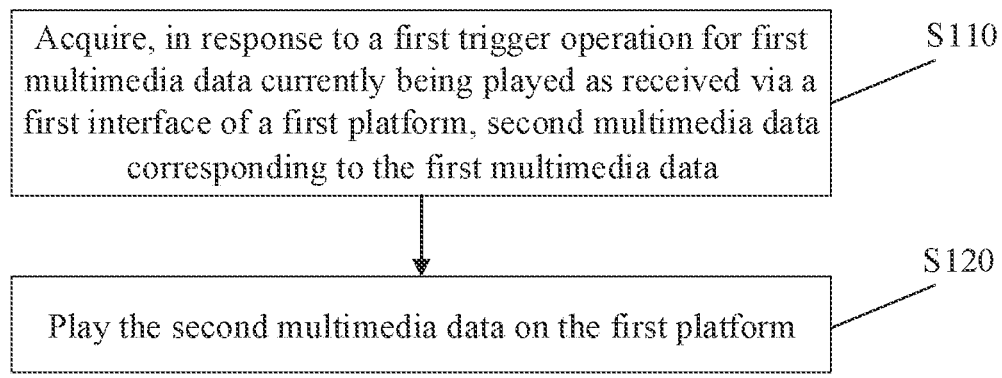
FIG. 1 is a flowchart of a method for playing multimedia data according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

It can be appreciated by those skilled in the art that, unless specifically stated otherwise, the singular forms "a", "an". "said", and "the" as used herein may also include plural forms. It can be further appreciated that the term "including" used in the description of the present disclosure refers to the presence of features, integers, steps, operations, elements, and/or components, but does not exclude the presence or addition of one or more other features, integers, steps, operations, elements, components, and/or any combination thereof. It can be appreciated that when an element is described as being "connected" or "coupled" to another element, it can be directly connected or coupled to the other element, or one or more intermediate elements may also be present. In addition, the term "connected" or "coupled" as used herein may include wireless connection or wireless coupling. The term "and/or" as used herein includes all or any of one or more associated listed items and all combinations thereof.

It can be appreciated by those skilled in the art that, unless otherwise defined, all terms (including technical terms and scientific terms) used herein have the same meaning as those commonly understood by those of ordinary skill in the art to which the present disclosure pertains. It can also be appreciated that terms such as those defined in a general dictionary should be understood as having the meaning consistent with the meaning in the context of the prior art, and unless specifically defined as in the description, they shall not be interpreted to have an idealized or unduly formal meaning.

The inventors of the present disclosure found in research that, in order to play audio on a video platform, e.g., to play complete background music in a video on a video play platform, the video platform needs to obtain the copyright of the complete background music. However, the video platform generally does not have the copyright of the complete background music, or would have a high cost to obtain the copyright.

A method for playing multimedia data, an apparatus for playing multimedia data, an electronic device, and a storage medium according to the present disclosure aim to solve the above technical problem in the prior art.

The technical solutions of the present disclosure and how the technical solutions of the present disclosure solve the above technical problem will be described in detail below with reference to specific embodiments. The following specific embodiments can be combined with each other, and the description of the same or similar concepts or processes may be omitted in some embodiments. The embodiments of the present disclosure will be described below in conjunction with the accompanying drawings.

The embodiment of the present disclosure provides a possible implementation. As shown in FIG. 1, a method for playing multimedia data is provided. The solution can be executed on a server side or on a client side. In the following, the solution will be described as being executed on the client side as an example. The method may include the following steps.

At step S110, in response to a first trigger operation for first multimedia data currently being played as received via a first interface of a first platform, second multimedia data corresponding to the first multimedia data is obtained.

At step S120, the second multimedia data is played on the first platform.

The solution according to the present disclosure may be, but not limited to be, applicable to the following scenario. For an electronic device (such as a server or a user terminal), given a first trigger operation for the first multimedia data currently being played on the first interface on the first platform, the client converts the received trigger operation into a trigger request and transmits it to a server. In response to the trigger request, the server acquires the second multimedia data of the multimedia currently being played on the first interface, and plays the second multimedia data on the first platform.

Here, the first multimedia data currently being played may be the first multimedia data in a playing state, or the first multimedia data in a pause state. The first multimedia data and the second multimedia data may both include audio data, video data, etc. Taking a video as an example, the pause state can be manually paused at any frame of the video, or can be any frame of the video that is displayed on the play interface after the playing of the video is completed according to a predetermined rule, such as the first or last frame of the video.

The first multimedia data currently being played may be a data segment of a short time length, such as a short video, or may be complete data of a long time length. The first platform can be a video play platform or an audio play platform. If the first platform is a video play platform, the first interface can be a video play interface or an audio play interface. Similarly, if the first platform is an audio play platform, the first interface may be an audio play interface or a video play interface. The video play platform may be a short video play platform.

The second multimedia data can be audio data extracted from the first multimedia data, such as background music in the video, audio data corresponding to a lecturer in a lecture scene, or complete voice data corresponding to the first multimedia data, etc. Here, if the first multimedia data includes audio data corresponding to a plurality of target users, the second multimedia data can be voice audio data corresponding to any target user. For example, when the video as lecture video, the second multimedia data of the video may be audio data corresponding to a lecturer.

The display length of the second multimedia data may be the same as the display length of the corresponding first multimedia data, or may be different from the display length of the first multimedia data. When the second multimedia data is background music as an example, if the display length of the background music displayed in the first multimedia data is only a segment of complete background music, the second multimedia data may be the complete background music.

Optionally, the operation of playing the second multimedia data of the first multimedia data on the currently playing first platform may include displaying a play interface for the second multimedia data on the current first interface.

When the first multimedia data is a video as an example, assuming that the first platform is a video play platform and the first interface is a video play interface, this solution is embodied on the client as follows. An entry to the second multimedia data corresponding to the video currently being played is provided on the video play platform, and the user can perform a trigger operation on the entry to trigger the playing of the second multimedia data, so as to play the second multimedia data on the video play platform.

With the method for playing multimedia data according to the present disclosure, the first multimedia data and the second multimedia data can be directly played on the first platform without jumping to another platform for playing. In this way, it is possible to shorten the length of the path from playing the first multimedia data to playing the second multimedia data, thereby improving the efficiency in obtaining the second multimedia data and improving the user experience.

Moreover, the second multimedia data can be played on the first platform with the play operation performed on the first platform only, without the need to download the second multimedia data to the first platform. Therefore, the amount of audio data processed on the first platform can be reduced.

In order to be make the solution for playing multimedia data according to the present disclosure and its technical effects more apparent, the specific implementation will be described below in detail with reference to a number of embodiments.

An embodiment of the present disclosure provides an implementation of a method for playing multimedia data, in which a first trigger operation includes at least one of: a predetermined gesture, a trigger operation for a predetermined area or a predetermined function option on the first interface, and a predetermined voice command.

Figure 2:
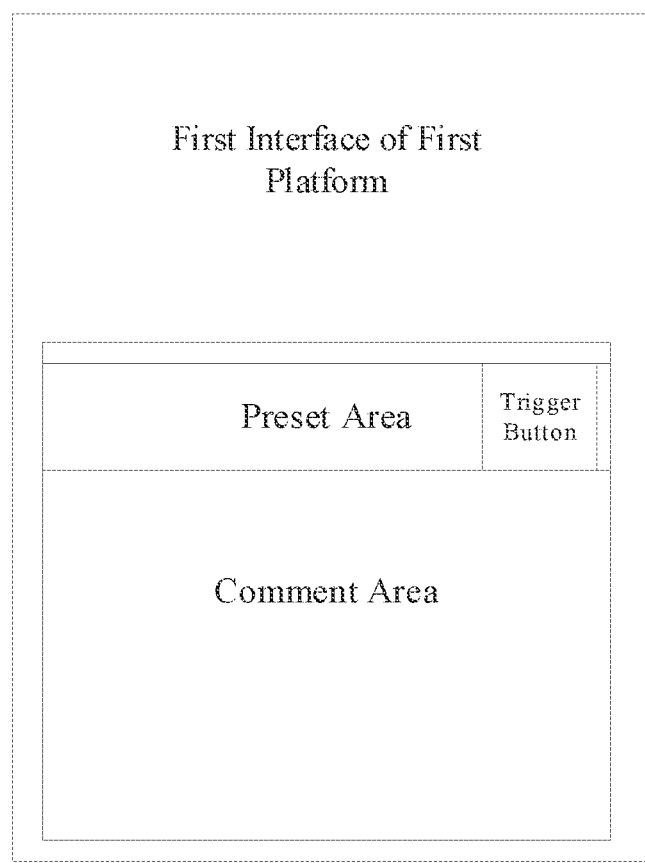
FIG. 2 is a schematic interface diagram showing a first interface provided with a trigger button for second multimedia data thereon according to an embodiment of the present disclosure.

In particular, for the trigger operation for the predetermined area or predetermined function option on the first interface, an area may be predetermined as the predetermined area on the first interface or a comment area for the first multimedia data. It is assumed that a click operation at any position in the predetermined area can be the first trigger operation, and the first trigger operation can be an audio play trigger operation. The first trigger operation can alternatively be a trigger button for the second multimedia data preconfigured on the first interface or in the comment area for the first multimedia data. As shown in FIG. 2, on the video play platform, a user information bar is provided at the top of the comment area for the video currently being played, and the area corresponding to the user information bar can be the predetermined area. In the user information bar, a "listen to complete music" button is provided as the trigger button for the second multimedia data. The user can trigger the second multimedia data by clicking any position in the user information bar or the "listen to complete music" button to enter the play interface for the second multimedia data.

Optionally, a predetermined gesture can be received on the first interface or in a specific area on the first interface. An association between the predetermined gesture and the first trigger operation is established and stored in advance. When the predetermined gesture is received, the audio play can be triggered.

Optionally, on the first interface, a voice command can be received via an audio module. When the voice command is the same (having the same semantics) as the predetermined voice command, such as "listen to complete music" and "open complete music", "listen to complete audio", etc., the audio play can be triggered.

In this embodiment, the predetermined gesture, the trigger operation for the predetermined area or the predetermined function option on the video play interface, or the predetermined voice command is used as a trigger operation for audio play. The second multimedia data can be triggered by the trigger operation to achieve the purpose of playing the second multimedia data on the first platform.

In an optional embodiment, the operation of acquiring the second multimedia data corresponding to the first multimedia data may include:

A1: transmitting a second multimedia data acquisition request in response to the first trigger operation, the request including a first multimedia data identifier; and A2: receiving the second multimedia data returned from a server in response to the second multimedia data acquisition request. Here, the second multimedia data can be determined by:

A21: determining related information of the second multimedia data corresponding to the first multimedia data identifier based on the first multimedia data identifier and a pre-established association between the first multimedia data identifier and the related information of the second multimedia data; and A22: determining the second multimedia data based on the determined related information of the second multimedia data.

The first trigger operation is received to provide the acquisition request for the second multimedia data, and the request includes the first multimedia data identifier. Based on the first multimedia data identifier and the pre-established association between the first multimedia data identifier and related information of audio data, the related information of the audio data that is associated with the first multimedia data identifier can be determined, and the second multimedia data can be determined based on the related information.

Optionally, the operation of playing the second multimedia data on the first platform may include: playing the second multimedia data via a second interface of the first platform. The second interface displays source information of the second multimedia data acquired.

The second interface may be an audio play interface or a video play interface. In addition to displaying the source information of the second multimedia data, the second interface may include at least one of text information and picture information of the second multimedia data. When the second multimedia data is music, in addition to displaying the source information of the music "Music A" (i.e., the source information of the second multimedia data is Music Platform A), the display interface for the second multimedia data can display text information, picture information, etc., of the second multimedia data. For example, when the second multimedia data is music, information such as lyrics, poster, singer, and play progress of the music can also be displayed. Of course, the audio display interface may only display the poster, singer, and play progress of the music, without displaying the lyrics of the music.

Figure 3A:
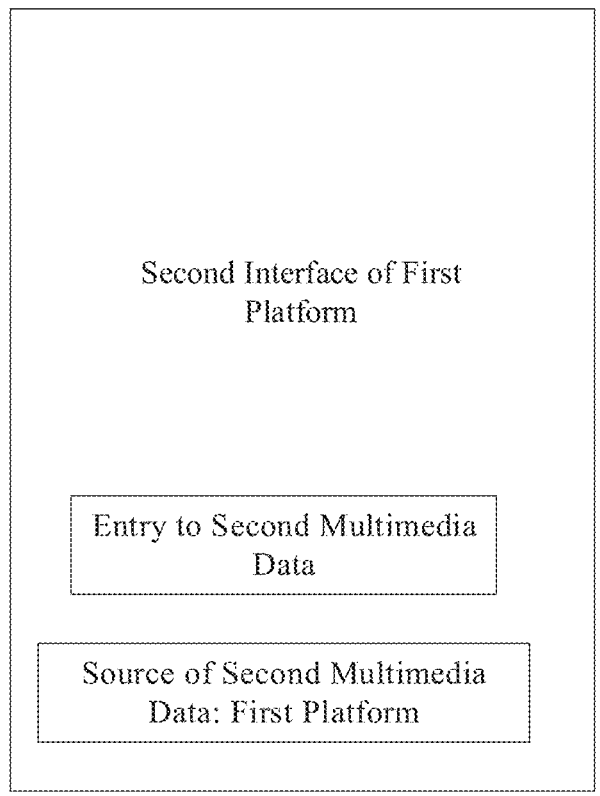
FIG. 3A is a diagram showing an interface for playing second multimedia data when source information of the second multimedia data is a first platform according to an embodiment of the present disclosure.
Figure 3B:
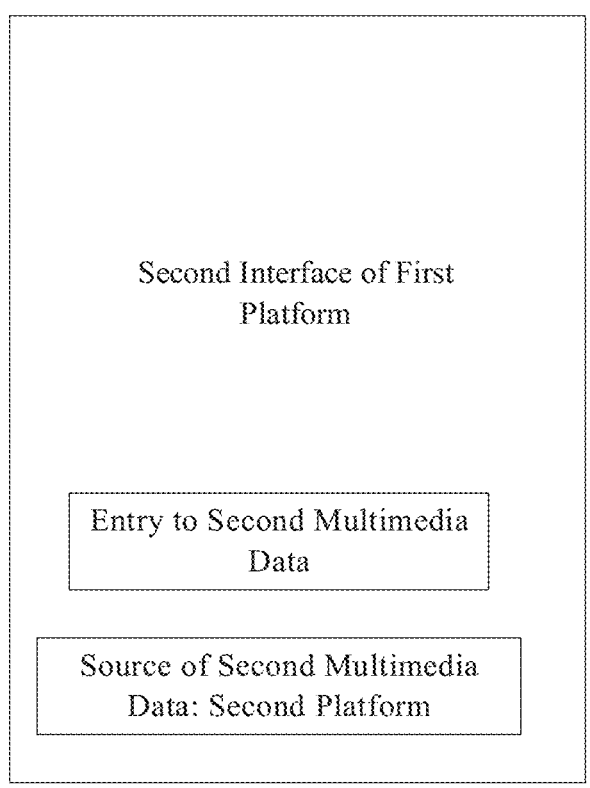
FIG. 3B is a diagram showing an interface for playing second multimedia data when source information of the second multimedia data is a second platform according to an embodiment of the present disclosure.

As shown in FIG. 2, the predetermined area can be the user information bar, and the trigger button provided in the user information bar can be used to transmit the acquisition request for the second multimedia data, so as to acquire the second multimedia data. The second multimedia data can be played on the second interface, and the information on the source from which the second multimedia data is acquired can be displayed on the second interface. The source information of the second multimedia data can be the current first platform (as shown in FIG. 3A), or a second platform (as shown in FIG. 3B), which can be a play platform other than the first platform currently playing the first multimedia data. When the second multimedia data is complete background music of a video, the second platform may be a cooperative platform that owns the copyright of the complete background music, such as a Music Platform A, a Music Platform C, etc.

Figure 3C:
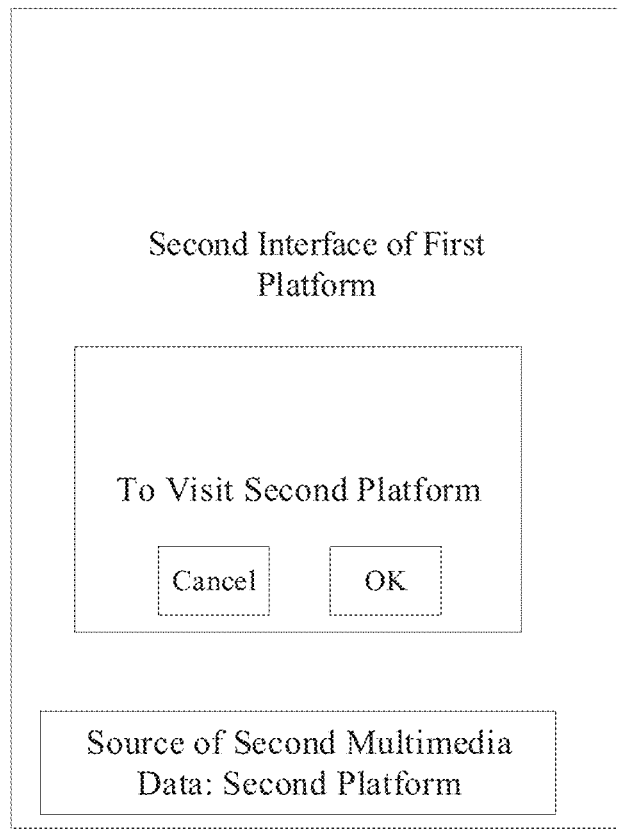
FIG. 3C is a schematic diagram showing a jump confirmation interface when source information of the second multimedia data is a second platform and a second trigger operation is received according to an embodiment of the present disclosure.

Further, the entry to the platform corresponding to the source information can be displayed in the second interface, and a relevant page of the corresponding platform can be entered through the entry, as shown in FIG. 3A and FIG. 3B. The source information in FIG. 3A is the first platform, the source information shown in FIG. 3B is the second platform. For the case where the platform corresponding to the source information is the second platform as shown in FIG. 3B, a jump button and the source information can be displayed at the bottom of the second interface. A jump interface towards the second platform is shown in FIG. 3C. The displayed page after jumping may include any of a download page of the second platform, a home page of the second platform, a play page for the second multimedia data on the second platform, etc.

When a click operation on the jumping button towards a platform corresponding to the source information is received on the second interface, and it is detected whether the platform is already installed on the current play device. If so, the corresponding platform is entered in response to the click operation on the jump button, so as to operate on the platform; or otherwise a download interface of the corresponding platform is entered in response to the click operation of the jump button, so as to download the platform and operate on the downloaded platform.

With reference to the examples shown in FIG. 3A to FIG. 3C, the following description is given. It is detected that the second platform has been installed on the play device of the first multimedia data, and an entry to the second multimedia data is provided on the second interface corresponding to the second multimedia data. For example, the entry can be a "download second multimedia data" button. When a click operation on the button is received on the play interface for the second multimedia data, a jump confirmation page as shown in FIG. 3C is displayed. The "OK" button on this interface can be clicked to enter the second platform where operations such as adding to favorites and downloading the second multimedia data can be performed.

In the method for playing multimedia data according to an optional embodiment, when the second interface receives a second trigger operation for the second multimedia data, a corresponding process can be performed according to the second trigger operation, and identification information of the second multimedia data can be stored.

Here, when the source from which the second multimedia data is acquired is a second platform other than the first platform, the operation of the corresponding process according to the second trigger operation may include: jumping to the second platform to perform the corresponding process according to the second trigger operation via the second platform.

Here, the second trigger operation may be an operation that can only be performed on a platform with processing authority, such as an operation performed on a play platform that has the copyright of the second multimedia data, such as adding to favorites, downloading, etc. The second trigger operation can be performed on the first platform or on the second platform.

If the above processing authority is the copyright of the second multimedia data, before receiving the second trigger operation for the second multimedia data, the method may further include: detecting whether the first platform currently playing the video has the copyright of the second multimedia data. If the first platform has the copyright of the second multimedia data, the second trigger operation can be performed on the first platform. If the first platform does not have the copyright of the second multimedia data, the method may jump to the second platform corresponding to the source from which the second multimedia data is acquired, and the corresponding process can be performed according to the second trigger operation via the second platform. Here, the jumping to the second platform corresponding to the source from which the second multimedia data is acquired can be performed using the jump button on the second interface.

On this basis, the method for playing multimedia data according to the present disclosure may further include: storing, after the second trigger operation being performed, the identification information of the second multimedia data on the platform on which the second trigger operation is performed.

Optionally, a folder for storing the identification information of the second multimedia data can be created on the platform with the processing authority. A plurality of folders can be created according to the operation type of the second trigger operation, and the identification information of the second multimedia data can be stored in a corresponding folder based on the operation type of the second trigger operation, so as to improve the subsequent search speed of the second multimedia data. The solution is illustrated using the following example. The first platform is a short video platform B, and a "listen to complete music" button is provided on the short video platform B for entering a play interface for the complete background music. The display can jump from the play interface to a music platform A via the "add to favorites and download complete music" button. Downloading and adding to favorites the complete background music can be performed on the music platform A. The identification information of the complete background music, such as the name, artist, and album of the complete background music can be stored in a folder on the music platform A. The folder can be an exclusive playlist folder created specifically for the first platform, and the name of the folder can be "favorite playlist for short video platform B".

In the solution according to this embodiment, when the second trigger operation is performed for the second multimedia data, if the first platform has no processing authority and the second trigger operation for the second multimedia data is received, the operation can jump to the second platform with processing authority in order to meet the processing requirements of the user. In addition, the first platform does not need to obtain additional processing authority of the second multimedia data, such as copyright, so as to avoid the cost paid for obtaining the processing authority of the second multimedia data and reducing the maintenance cost of the first platform.

In an optional embodiment, the method for playing multimedia data may further includes:

B1: adjusting, in response to a screen lock instruction for the second interface, the second interface to a locked screen state, and playing the second multimedia data in background; and B2: displaying a play control area for the second multimedia data on a third interface in the locked screen state.

With the play control area, the control of the play status, the control of the play progress, and the control of the play volume of the second multimedia data can be achieved.

A screen lock instruction for the second interface may be received while the second multimedia data is being played, and in response to the screen lock instruction, the second interface is adjusted to the locked screen state, and the display interface in the locked screen state is the third interface, which can be a predetermined screen saver interface, etc. The second multimedia data can be played in background, and the play control area for the second multimedia data can be displayed on the third interface in the locked screen state. The user's play control operation on the second multimedia data can be received via the play control area.

In the solution provided in this embodiment, when the second interface is in the locked screen state, the play control of the second multimedia data can still be performed, which is beneficial to reduce the consumption of system resources in the process of playing audio data.

It is worth noting that the play control area may also be displayed in the non-locked screen state, and when the second interface is in the non-locked screen state, the play control area may be displayed in the drop-down notification bar of the play device.

Here, the display page and play of the second multimedia data can be implemented based on the H5 technique, and can also be implemented using a mini program, a React Native page, etc. That is, the second interface can be an H5 page or a small program page, or the second interface can be displayed via a cross-platform framework such as React Native.

The play interface for the audio data displayed on the H5 page, i.e., the second interface, is compatible with both PC and mobile terminals, both Windows and Linux, both Android and IOS, and can be easily transplanted to various open platforms and application platforms. This powerful compatibility can significantly reduce development and operation costs. In addition, the storage of H5 pages does not require downloading to occupy storage space, and can reduce occupation of local storage resources. Moreover, the H5 technique allows developers to create advanced graphics, layouts, animations, and transition effects without relying on third-party browser plug-ins, and allows users to enjoy cool visual and auditory effects with less traffic.

In addition, the mini program, like the cross-platform form of H5, can also be compatible with different operating systems. With a compatibility layer similar to JSBridge and a communication control module, messaging between the mini program and the first or second platform can be established, to provide UI interaction of the mini program interface, and facilitate user control.

Figure 4:
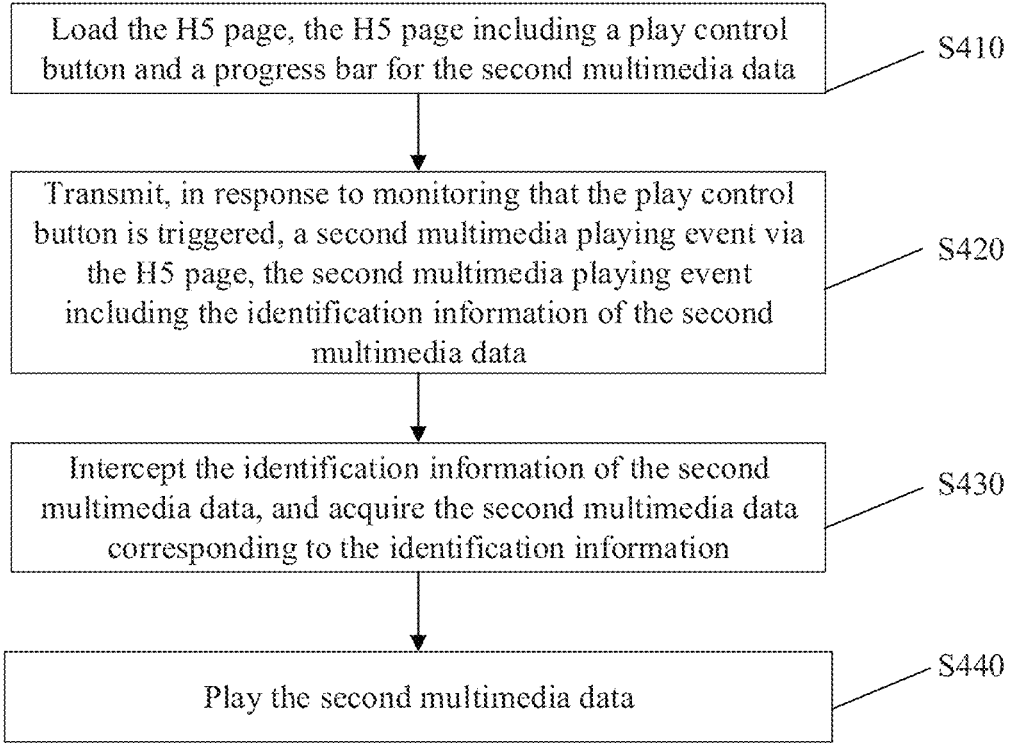
FIG. 4 is a flowchart of a process for playing second multimedia data on a first platform according to an embodiment of the present disclosure.

The present disclosure provides an alternative embodiment based on the H5 technique to play the second multimedia data. The second multimedia data can be played on the first platform in the following process. Its flowchart is shown in FIG. 4, including:

S410: loading an H5 page, the H5 page including a play control button and a progress bar for the second multimedia data;

S420: transmitting, in response to monitoring that the play control button is triggered, a second multimedia playing event via the H5 page, the second multimedia playing event including the identification information of the second multimedia data;

S430: intercepting the identification information of the second multimedia data, and acquiring the second multimedia data corresponding to the identification information; and S440: playing the second multimedia data.

Figure 5:
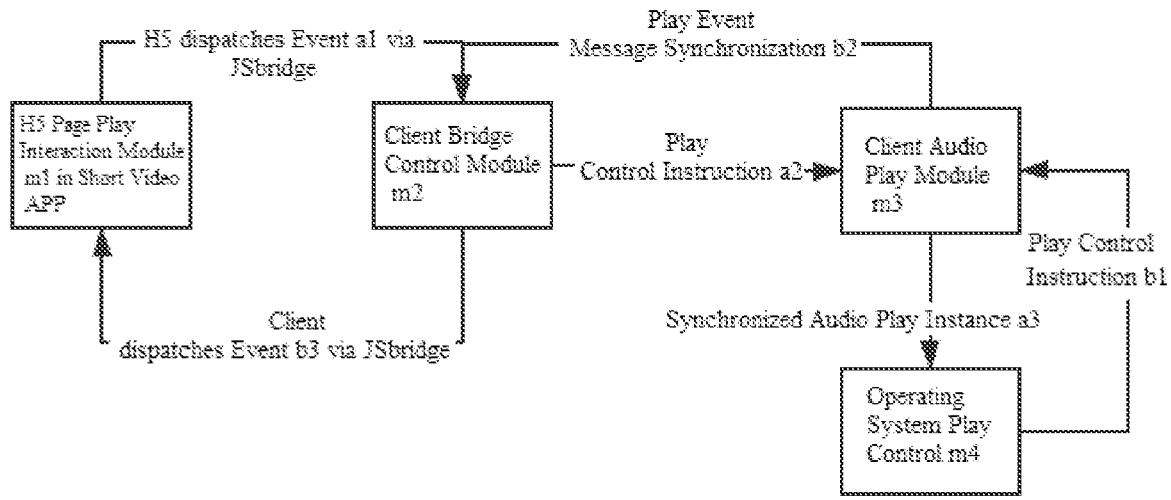
FIG. 5 is a schematic diagram showing playing second multimedia data via an H5 page according to an embodiment of the present disclosure.

In this embodiment, the second multimedia data can be played via the H5 page. In the following, an example will be given, in which the first platform is a video play platform. As shown in FIG. 5, an H5 page corresponding to the second multimedia data is first loaded on the first platform, and then a play interaction module m1 (corresponding to the H5 page play module m1 in the short video APP shown in FIG. 5) is loaded in the H5 page. The play interaction module m1 includes a play control button, a progress bar, etc.

The play control button and the progress bar are continuously monitored, and when it is monitored that the play control button on the H5 page is triggered, an audio playing event (corresponding to the H5 dispatching Event a1 via JSbridge as shown in FIG. 5) is transmitted to the first platform via the H5 page. Optionally, the H5 page can transmit an audio playing event to the client using a predetermined JSBridge event. The lower layer usually dispatches a URL Scheme message to the first platform in a form of an iframe. The URL Scheme message includes an event name and the identification information of the second multimedia data. The identification information of the second multimedia data may include parameters required to play the second multimedia data. For example, when the second multimedia data is music, the parameters may include related information including information of the music such as acquisition address, singer, song name, etc. The above process is shown at a1 in FIG. 5.

Then, the URL Scheme is intercepted by a predetermined Bridge control module m2 (corresponding to the client Bridge control module m2 shown in FIG. 5), that is the related information of the second multimedia data is intercepted. It is determined that a play request for the music is received. An audio play module m3 (corresponding to the client audio play module m3 shown in FIG. 5) is invoked to play the song corresponding to the network address of the music included in the URL Scheme parameters. As shown in the process a2 in FIG. 5, the Bridge control module can be a JSBridge control module. JSBridge is a Bridge implemented in JS language and is used to implement two-way communication between the first platform and the H5 page. There are many implementation schemes for JSBridge to invoke messages in the play platform, mainly including intercepting URL Scheme, rewriting prompt, injecting API, etc. The present disclosure mainly implements communication between the first platform and the H5 page by intercepting URL Scheme.

Finally, the second multimedia data is played using the predetermined client audio playing module m3 to achieve playing of the second multimedia data. Optionally, the audio play module m3 may be a native play module, which can provide system-level play functions and can achieve multi-terminal compatible play. The native play module can also achieve display and interaction of the play control bar.

In the embodiment according to the present disclosure, the H5 page can implement the cross-platform play control of the second multimedia data, and can be compatible with different terminals and different operating systems to play the second multimedia data.

In an optional embodiment, the operation of playing the second multimedia data may include:

C1: monitoring a system play control message, and displaying a play status of the second multimedia data synchronously in the play control area for the second multimedia data.

The method may further include, subsequent to playing the second multimedia data:

C2: synchronizing the play status of the second multimedia data to a predetermined system play control area;

C3: receiving a control operation by a user for the second multimedia data in the system play control area; and C4: performing a play control on the second multimedia data using the control operation.

Here, the play status may include at least one of: the audio data being in a play stage or a pause stage, a play progress of the audio data, a play volume of the audio data, etc.

Referring to FIG. 5, the system play control message is monitored by an audio play module, and the play status of the second multimedia data is synchronously displayed in the play control area for the second multimedia data. Then, the play status of the second multimedia data is synchronized to a predetermined operating system play control module. The operating system play control module is configured to control the play status of the second multimedia data in the play control area, receive a control operation by the user for the second multimedia data in the control area, transmit a play control instruction to deliver interactive information corresponding to the control operation to the audio play module for play control of the second multimedia data. In particular, the audio play module m3 synchronizes the play status of the audio play module to the system play control module m4 (corresponding to the operating system play control module m4 shown in FIG. 5) via a synchronized audio play instance a3, and displays the play status in the play control area. When the play control area receives the control operation by the user for the second multimedia data, the system play control module m4 transmits the play control instruction b1 to deliver the interactive information corresponding to the control operation to the audio play module m3 for play control of the second multimedia data.

For example, the system play control area shows that the second multimedia data is in a played status, and a pause operation performed by the user in the system play control area is received. The system play control module transmits a control instruction indicating that the second multimedia data is to be paused to the audio play module. In response to the instruction, the audio play control module pauses the play of the second multimedia data.

In the present disclosure, the play status of the audio play module can be synchronized to the system play control area by monitoring the system play control message, and the play status of the second multimedia data can be synchronously displayed in the system play control area. The user can perform the control operation for play control in the system play control area, so as to apply play control on the second multimedia data based on the interactive information corresponding to the control operation. This solution allows synchronizing and displaying the play status of the second multimedia data in the system play control area, such that the user can perform play control of the second multimedia data in the system play control area.

In an optional embodiment, the method for playing multimedia data may further include: feeding back and displaying on the H5 page the play status of the second multimedia data after the play control.

Optionally, as shown in FIG. 5, the audio play control module responds to the play control instruction transmitted by the system play control module to perform play control on the second multimedia data, and synchronizes the event message after the play control to the JSBridge control module. Then, the JSBridge control module transmits the JSBridge dispatch event to feed back the play status of the second multimedia data after the play control to the play interaction module for displaying on the H5 page.

As shown in FIG. 5, the audio play module m3 responds to the play control instruction transmitted by the operating system play control module m4 to perform play control on the second multimedia data, and then synchronizes the play event message to the Bridge control module m2, which then feeds back the play event message to the H5 page via the JSBridge dispatch event. For example, the play control button in the play interaction module m1 on the H5 page can be used to display the current play status.

The solution according to this embodiment feeds back the control operation performed by the user in the system play control area to the H5 page, and achieves play control of the second multimedia data in the play control area. This solution allows play control of the second multimedia data when the second interface is in the locked screen state.

Figure 6:
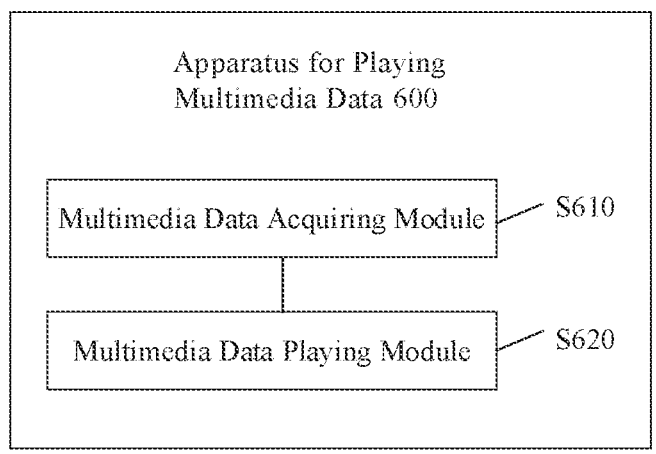
FIG. 6 is a schematic diagram showing a structure of an apparatus for playing multimedia data according to an embodiment of the present disclosure.

Further, an embodiment of the present disclosure also provides a possible implementation. As shown in FIG. 6, an apparatus 600 for playing multimedia data is provided, including a second multimedia data acquiring module 610 and a second multimedia data playing module 620.

The second multimedia data acquiring module 610 is configured to acquire, in response to a first trigger operation for first multimedia data currently being played as received via a first interface of a first platform, second multimedia data corresponding to the first multimedia data.

The second multimedia data playing module 620 is configured to play the second multimedia data on the first platform.

The apparatus for playing multimedia data according to the embodiment of the present disclosure can perform a method for playing multimedia data according to the embodiment of the present disclosure, and their implementation principles are similar. The action performed by each module in the apparatus for playing multimedia data in each embodiment of the present disclosure corresponds to a step in the method for playing multimedia data in each embodiment of the present disclosure. For the details of the function of each module of the apparatus for playing multimedia data, reference can be made to the corresponding method for playing multimedia data as described above, and description thereof will be omitted here.

Based on the same principle as the method shown in the embodiment of the present disclosure, an electronic device is also provided according to an embodiment of the present disclosure. The electronic device may include, but not limited to, a processor and a memory. The memory is configured to store computer operation instructions. The processor is configured to invoke the computer operation instructions to execute the method for playing multimedia data shown in the embodiment. Compared with the related art, in the method for playing multimedia data according to the present disclosure, in response to the first trigger operation on the first interface of the first platform, the second multimedia data corresponding to the first multimedia data is acquired, and the second multimedia data is played directly on the first platform, without the need to jump to another platform for searching and playing. In this way, it is possible to shorten the length of the path from playing the first multimedia data to playing the second multimedia data, thereby improving the efficiency in playing the second multimedia data and improving the user experience.

Figure 7:
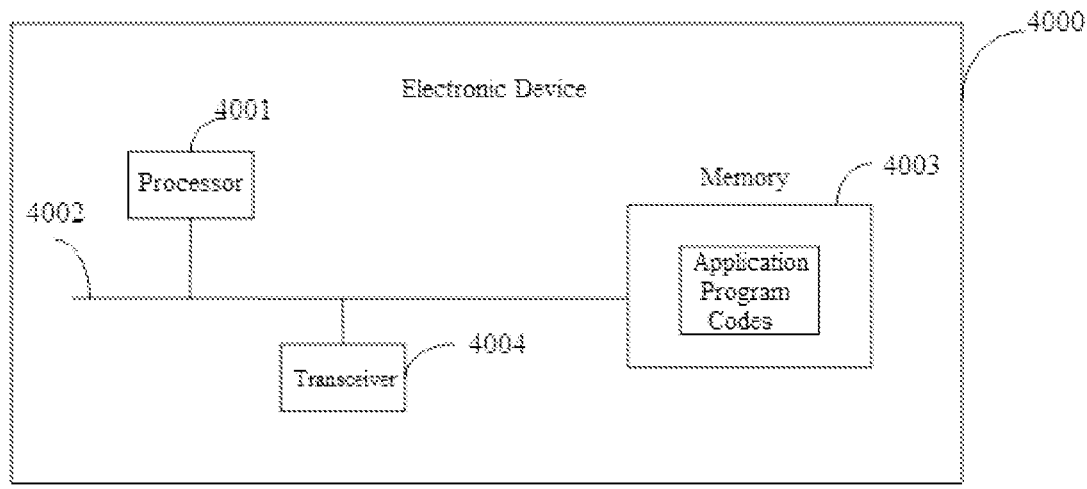
FIG. 7 is a schematic diagram showing a structure of an electronic device according to an embodiment of the disclosure.

In an optional embodiment, an electronic device is provided, as shown in FIG. 7. The electronic device 4000 shown in FIG. 7 may be a client, and includes a processor 4001 and a memory 4003. Here, the processor 4001 and the memory 4003 are connected to each other, e.g., via a bus 4002. Optionally, the electronic device 4000 may further include a transceiver 4004. It should be noted that in actual applications, the electronic device 4000 is not limited to include only one transceiver 4004, and the structure of the electronic device 4000 does not constitute a limitation to the embodiments of the present disclosure.

The processor 4001 can be a Central Processing Unit (CPU), a general-purpose processor, a Digital Signal Processor (DSP), an Application Specific Integrated Circuit (ASIC), an FPGA (Field Programmable Gate Array), a Field Programmable Gate Array (FPGA), or any other programmable logic device, transistor logic device, hardware component, or any combination thereof. It can implement or execute various exemplary logical blocks, modules, and circuits described in the present disclosure. The processor 4001 may also be a combination that implements computing functions, such as a combination of one or more microprocessors, a combination of one or more DSPs and one or more microprocessors, etc.

The bus 4002 may include a path for transferring information between the above components. The bus 4002 may be a Peripheral Component Interconnect (PCI) bus, an Extended Industry Standard Architecture (EISA) bus, or the like. The bus 4002 can be divided into an address bus, a data bus, a control bus, and so on. For the purpose of illustration, only one thick line is used in FIG. 7, but it does not mean that there is only one bus or one type of bus.

The memory 4003 may be a Read Only Memory (ROM) or any other type of static storage device that can store static information and instructions, a Random Access Memory (RAM) or any other type of dynamic storage device that can store information and instructions, an Electrically Erasable Programmable Read Only Memory (EEPROM), a Compact Disc Read Only Memory (CD-ROM), or any other optical disk storage, optical disc storage (including compressed disc, laser disc, optical disc, digital versatile disc, blue-ray disc, etc.), magnetic disk storage medium, or other magnetic storage device, or any other medium can be used to carry or store desired program codes in the form of instructions or data structures so as to be accessed by a computer. The present disclosure is not limited to any of these examples.

The memory 4003 is configured to store application program codes for implementing the solutions of the present disclosure, and is controlled by the processor 4001 for execution. The processor 4001 is configured to execute the application program codes stored in the memory 4003 to implement the content shown in the above method embodiments.

Here, the electronic device may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 7 is exemplary only, and should not be construed as limiting the function and scope of use of the embodiments of the present disclosure.

The embodiments of the present disclosure provide a computer-readable storage medium having a computer program stored thereon. The computer program, when running on a computer, cause the computer to execute the corresponding content in the above method embodiments.

It can be appreciated that although various steps in the flowcharts are shown in sequence as indicated by the arrows, these steps are not necessarily performed in sequence in the order indicated by the arrows. Unless explicitly stated herein, the execution of these steps is not strictly limited to any order, and they can be executed in other orders. Moreover, at least part of the steps in the flowcharts may include a plurality of sub-steps or stages. These sub-steps or stages are not necessarily executed at the same time, but can be executed at different time, and they are not necessarily performed sequentially, but may be performed in turn or alternately with at least some of other steps or sub-steps or stages of other steps.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof more specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier, which carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, and may transmit, propagate, or transfer programs used by or used with an instruction execution system, apparatus or device. The program codes contained in the computer-readable medium may be transmitted via any appropriate medium, including but not limited to electric cable, optical cable, Radio Frequency (RF), or any suitable combination thereof.

The above computer-readable medium may be included in the above electronic device; or may be standalone without being assembled into the electronic device.

The above computer-readable medium may carry one or more programs which, when executed by the electronic device, cause the electronic device to perform the steps of the methods according to the above embodiments.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Modules involved and described in the embodiments of the present disclosure may be implemented in software or hardware. A name of a module does not constitute a limitation on the module itself under certain circumstances. For example, an audio data playing module may also be described as "a module for playing second multimedia data on a first platform".

According to one or more embodiments of the present disclosure, a method for playing multimedia data is provided. The method includes: acquiring, in response to a first trigger operation for first multimedia data currently being played as received via a first interface of a first platform, second multimedia data corresponding to the first multimedia data and playing the second multimedia data on the first platform.

Optionally, the first trigger operation may include at least one of: a predetermined gesture, a trigger operation for a predetermined area or a predetermined function option on the first interface, and a predetermined voice command.

Optionally, the operation of acquiring the second multimedia data corresponding to the first multimedia data may include: transmitting a second multimedia data acquisition request in response to the first trigger operation, the request including a first multimedia data identifier; and receiving the second multimedia data returned from a server in response to the second multimedia data acquisition request. The second multimedia data may be determined by: determining related information of the second multimedia data corresponding to the first multimedia data identifier based on the first multimedia data identifier and a pre-established association between the first multimedia data identifier and the related information of the second multimedia data; and determining the second multimedia data based on the determined related information of the second multimedia data.

Optionally, the operation of playing the second multimedia data on the first platform may include: playing the second multimedia data via a second interface of the first platform, the second interface displaying information on a source from which the second multimedia data is acquired.

Optionally, the method for playing multimedia data may further include: performing, when the second interface receives a second trigger operation for the second multimedia data, a corresponding process according to the second trigger operation, and storing identification information of the second multimedia data. The operation of performing the corresponding process according to the second trigger operation may include, when the source from which the second multimedia data is acquired is a second platform other than the first platform: jumping to the second platform to perform the corresponding process according to the second trigger operation via the second platform.

Optionally, the method for playing multimedia data may further include: adjusting, in response to a screen lock instruction for the second interface, the second interface to a locked screen state, and playing the second multimedia data in background; and displaying a play control area for the second multimedia data on a third interface in the locked screen state.

Optionally, the second interface may be an H5 page.

Optionally, the operation of playing the second multimedia data on the first platform may include: loading the H5 page, the H5 page including a play control button and a progress bar for the second multimedia data; transmitting, in response to monitoring that the play control button is triggered, a second multimedia playing event via the H5 page, the second multimedia playing event including the identification information of the second multimedia data; intercepting the identification information of the second multimedia data, and acquiring the second multimedia data corresponding to the identification information; and playing the second multimedia data.

Optionally, the operation of playing the second multimedia data may include: monitoring a system play control message, and displaying a play status of the second multimedia data synchronously in the play control area for the second multimedia data. The method may further include, subsequent to playing the second multimedia data: synchronizing the play status of the second multimedia data to a predetermined system play control area; performing, in response to receiving a control operation by a user for the second multimedia data in the system play control area, a play control on the second multimedia data using the control operation.

Optionally, the method for playing multimedia data may further include: feeding back and displaying on the H5 page the play status of the second multimedia data after the play control.

According to one or more embodiments of the present disclosure, an apparatus for displaying multimedia data is also provided. The apparatus includes a second multimedia data acquiring module configured to acquire, in response to a first trigger operation for first multimedia data currently being played as received via a first interface of a first platform, second multimedia data corresponding to the first multimedia data, and a second multimedia data playing module configured to play the second multimedia data on the first platform.

Optionally, the first trigger operation may include at least one of: a predetermined gesture, a trigger operation for a predetermined area or a predetermined function option on the first interface, and a predetermined voice command.

Optionally, the second multimedia data acquiring module may be configured to: transmit a second multimedia data acquisition request in response to the first trigger operation, the request including a first multimedia data identifier; and receive the second multimedia data returned from a server in response to the second multimedia data acquisition request. The second multimedia data may be determined by: determining related information of the second multimedia data corresponding to the first multimedia data identifier based on the first multimedia data identifier and a pre-established association between the first multimedia data identifier and the related information of the second multimedia data and determining the second multimedia data based on the determined related information of the second multimedia data.

Optionally, the second multimedia data playing module may be configured to: play the second multimedia data via a second interface of the first platform, the second interface displaying information on a source from which the second multimedia data is acquired.

Optionally, the apparatus for playing multimedia data may further include: a second trigger operation module configured to perform, when the second interface receives a second trigger operation for the second multimedia data, a corresponding process according to the second trigger operation, and store identification information of the second multimedia data. When the source from which the second multimedia data is acquired is a second platform other than the first platform, the second trigger operation module may further include a jumping unit configured to jump to the second platform to perform the corresponding process according to the second trigger operation via the second platform.

Optionally, the apparatus for playing multimedia data may further include: a screen locking module configured to adjust, in response to a screen lock instruction for the second interface, the second interface to a locked screen state, and play the second multimedia data in background; and a play control module configured to display a play control area for the second multimedia data on a third interface in the locked screen state.

Optionally, the second interface may be an H5 page.

Optionally, the second multimedia data playing module may further include: a loading unit configured to load the H5 page, the H5 page including a play control button and a progress bar for the second multimedia data; a monitoring unit configured to transmit, in response to monitoring that the play control button is triggered, a second multimedia playing event via the H5 page, the second multimedia playing event including the identification information of the second multimedia data: a second multimedia data acquiring unit configured to intercept the identification information of the second multimedia data, and acquire the second multimedia data corresponding to the identification information; and a second multimedia data playing unit configured to play the second multimedia data.

Optionally, the second multimedia data playing unit may be configured to monitor a system play control message, and display a play status of the second multimedia data synchronously in the play control area for the second multimedia data. The apparatus for playing multimedia data may further include, a synchronizing module configured to synchronize the play status of the second multimedia data to a predetermined system play control area and a play control module configured to perform, in response to receiving a control operation by a user for the second multimedia data in the system play control area, a play control on the second multimedia data using the control operation.

Optionally, the apparatus for playing multimedia data may further include: a feedback module configured to feed back and display on the H5 page the play status of the second multimedia data after the play control.

The above description only provides preferred embodiments of the present disclosure and an explanation of the applied technical principles. It can be appreciated by those skilled in the art that the scope of disclosure involved in this disclosure is not limited to the technical solutions formed by the specific combination of the above technical features, and is to cover other technical solutions formed by arbitrarily combining the above technical features or equivalents thereof without departing from the above disclosed concept, e.g., technical solutions formed by replacing the above features with the technical features disclosed, but not limited to be disclosed, in the present disclosure with similar functions.

In addition, although the operations are depicted in a specific order, this should not be understood as these operations being required to be performed in the specific order shown or performed in a sequential order. Under certain circumstances, multitasking and parallel processing may be advantageous. Likewise, although a number of specific implementation details are included in the above discussion, these should not be construed as limiting the scope of the present disclosure. Certain features that are described in the context of separate embodiments can also be implemented in combination in a single embodiment. On the other hand, various features described in the context of a single embodiment can also be implemented in multiple embodiments individually or in any suitable sub-combination. Although the subject matter has been described in language specific to structural features and/or logical actions of the methods, it should be understood that the subject matter defined in the claims as attached is not necessarily limited to the specific features or actions described above. On the contrary, the specific features and actions described above are merely exemplary forms of implementing the claims.

What is claimed is:

1. A method for playing multimedia data, comprising:

receiving, via a first interface of a first platform, a first trigger operation for first multimedia data currently being played, the first trigger operation triggering acquiring and playing of second multimedia data corresponding to the first multimedia data, the first multimedia data being video data, the second multimedia data being audio data, a sound represented by the audio data being at least partially identical to a sound component of a video represented by the video data, wherein the sound represented by the audio data is a fragment of the sound component of the video represented by the video data, or the sound represented by the audio data is identical to the sound component of the video represented by the video data, or the sound component of the video represented by the video data is a fragment of the sound represented by the audio data;

acquiring, when the first platform has a copyright of the second multimedia data, the second multimedia data from the first platform;

acquiring, when the first platform has no copyright of the second multimedia data, the second multimedia data from a second platform other than the first platform which has the copyright of the second multimedia data; and playing the acquired second multimedia data on the first platform, and displaying a source of the second multimedia data, wherein said playing the acquired second multimedia data on the first platform comprises:

playing the second multimedia data via a second interface of the first platform, the second interface displaying information on a source from which the second multimedia data is acquired, wherein the method further comprises:

performing, when the second interface receives a second trigger operation for the second multimedia data, a corresponding process other than playing of the second multimedia data according to the second trigger operation, and storing identification information of the second multimedia data, wherein said performing the corresponding process other than playing of the second multimedia data according to the second trigger operation comprises:
performing, when the first platform has the copyright of the second multimedia data, the corresponding process on the first platform according to the second trigger operation; and
jumping, when the first platform has no copyright of the second multimedia data while the second platform has the copyright of the second multimedia data, to the second platform to perform the corresponding process according to the second trigger operation via the second platform.

2. The method according to claim 1, wherein the first trigger operation comprises at least one of:
a predetermined gesture, a trigger operation for a predetermined area or a predetermined function option on the first interface, and a predetermined voice command.

3. The method according to claim 1, wherein said acquiring the second multimedia data corresponding to the first multimedia data comprises:
transmitting a second multimedia data acquisition request in response to the first trigger operation, the request including a first multimedia data identifier; and
receiving the second multimedia data returned from a server in response to the second multimedia data acquisition request, wherein the second multimedia data is determined by:
determining related information of the second multimedia data corresponding to the first multimedia data identifier based on the first multimedia data identifier and a pre-established association between the first multimedia data identifier and the related information of the second multimedia data; and
determining the second multimedia data based on the determined related information of the second multimedia data.

4. The method according to claim 1, further comprising:
adjusting, in response to a screen lock instruction for the second interface, the second interface to a locked screen state, and playing the second multimedia data in background; and
displaying a play control area for the second multimedia data on a third interface in the locked screen state.

5. The method according to claim 1, wherein the second interface is an H5 page.

6. The method according to claim 5, wherein said playing the second multimedia data on the first platform comprises:
loading the H5 page, the H5 page comprising a play control button and a progress bar for the second multimedia data;
transmitting, in response to monitoring that the play control button is triggered, a second multimedia playing event via the H5 page, the second multimedia playing event comprising identification information of the second multimedia data;
intercepting the identification information of the second multimedia data, and acquiring the second multimedia data corresponding to the identification information; and
playing the second multimedia data.

7. The method of claim 6, wherein said playing the second multimedia data comprises:
monitoring a system play control message, and displaying a play status of the second multimedia data synchronously in a play control area for the second multimedia data,
wherein the method further comprises, subsequent to playing the second multimedia data:
synchronizing the play status of the second multimedia data to a predetermined system play control area;
performing, in response to receiving a control operation by a user for the second multimedia data in the system play control area, a play control on the second multimedia data using the control operation.

8. The method of claim 7, further comprising:
feeding back and displaying on the H5 page the play status of the second multimedia data after the play control.

9. A computer-readable non-transitory storage medium, having a computer program stored thereon, the program, when executed by a processor, implements the method for playing multimedia data according to claim 1.

10. An electronic device, comprising a memory, a processor, and a computer program stored on the memory and executable on the processor, wherein the processor is configured to, when executing the program:
receive, via a first interface of a first platform, a first trigger operation for first multimedia data currently being played, the first trigger operation triggering acquiring and playing of second multimedia data corresponding to the first multimedia data, the first multimedia data being video data, the second multimedia data being audio data, a sound represented by the audio data being at least partially identical to a sound component of a video represented by the video data, wherein the sound represented by the audio data is a fragment of the sound component of the video represented by the video data, or the sound represented by the audio data is identical to the sound component of the video represented by the video data, or the sound component of the video represented by the video data is a fragment of the sound represented by the audio data;
acquire, when the first platform has a copyright of the second multimedia data, the second multimedia data from the first platform;
acquire, when the first platform has no copyright of the second multimedia data, the second multimedia data from a second platform other than the first platform which has the copyright of the second multimedia data; and
play the acquired second multimedia data on the first platform, and displaying a source of the second multimedia data,
wherein said playing the acquired second multimedia data on the first platform comprises:
playing the second multimedia data via a second interface of the first platform, the second interface displaying information on a source from which the second multimedia data is acquired,
wherein the processor is further configured to, when executing the program:
perform, when the second interface receives a second trigger operation for the second multimedia data, a corresponding process other than playing of the second multimedia data according to the second trigger operation, and store identification information of the second multimedia data,
wherein said performing the corresponding process other than playing of the second multimedia data according to the second trigger operation comprises:

performing, when the first platform has the copyright of the second multimedia data, the corresponding process on the first platform according to the second trigger operation; and jumping, when the first platform has no copyright of the second multimedia data while the second platform has the copyright of the second multimedia data, to the second platform to perform the corresponding process according to the second trigger operation via the second platform.

11. The electronic device according to claim 10, wherein the first trigger operation comprises at least one of:

a predetermined gesture, a trigger operation for a predetermined area or a predetermined function option on the first interface, and a predetermined voice command.

12. The electronic device according to claim 10, wherein said acquiring the second multimedia data corresponding to the first multimedia data comprises:

transmitting a second multimedia data acquisition request in response to the first trigger operation, the request including a first multimedia data identifier; and receiving the second multimedia data returned from a server in response to the second multimedia data acquisition request, wherein the second multimedia data is determined by:

determining related information of the second multimedia data corresponding to the first multimedia data identifier based on the first multimedia data identifier and a pre-established association between the first multimedia data identifier and the related information of the second multimedia data; and determining the second multimedia data based on the determined related information of the second multimedia data.

13. The electronic device according to claim 10, wherein the processor is further configured to, when executing the program:

adjust, in response to a screen lock instruction for the second interface, the second interface to a locked screen state, and play the second multimedia data in background; and display a play control area for the second multimedia data on a third interface in the locked screen state.

14. The electronic device according to claim 10, wherein the second interface is an H5 page.

15. The electronic device according to claim 14, wherein said playing the second multimedia data on the first platform comprises:

loading the H5 page, the H5 page comprising a play control button and a progress bar for the second multimedia data;

transmitting, in response to monitoring that the play control button is triggered, a second multimedia playing event via the H5 page, the second multimedia playing event comprising identification information of the second multimedia data;

intercepting the identification information of the second multimedia data, and acquiring the second multimedia data corresponding to the identification information; and playing the second multimedia data.

16. The electronic device according to claim 15, wherein said playing the second multimedia data comprises:

monitoring a system play control message, and displaying a play status of the second multimedia data synchronously in a play control area for the second multimedia data, wherein the method further comprises, subsequent to playing the second multimedia data:

synchronizing the play status of the second multimedia data to a predetermined system play control area;

performing, in response to receiving a control operation by a user for the second multimedia data in the system play control area, a play control on the second multimedia data using the control operation.

* * * * *